No. 891,470. PATENTED JUNE 23, 1908.
S. A. EKEHORN.
ROTARY CHURN.
APPLICATION FILED JULY 28, 1904.

2 SHEETS—SHEET 1.

Witnesses
Sven August Ekehorn
Inventor,
By his Attorney

No. 891,470.
PATENTED JUNE 23, 1908.
S. A. EKEHORN.
ROTARY CHURN.
APPLICATION FILED JULY 28, 1904.

2 SHEETS—SHEET 2.

Witnesses
Sven August Ekehorn
Inventor
By his Attorney

UNITED STATES PATENT OFFICE.

SVEN AUGUST EKEHORN, OF SÖDERTELGE, SWEDEN, ASSIGNOR TO SVENSKA CENTRIFUG AKTIEBOLAGET, OF STOCKHOLM, SWEDEN.

ROTARY CHURN.

No. 891,470.  Specification of Letters Patent.  Patented June 23, 1908.

Application filed July 28, 1904. Serial No. 218,489.

*To all whom it may concern:*

Be it known that I, SVEN AUGUST EKEHORN, a subject of the King of Sweden, residing in Södertelge, in the Kingdom of Sweden, have invented certain new and useful Improvements in Rotary Churns, of which the following is a specification.

This invention relates to the class of rotary churns wherein the containing vessel or bowl rotates and is provided with wings to cause the cream to partake of the rotation of the bowl, and also with a stationary agitating wing.

The object of the invention is to dispose the moving wings in such a manner that they will not only cause the cream to rotate with the bowl but also cause it to circulate in the direction of the axis of the same, or somewhat vertically. This circulation is aided by the concavity of the bottom of the bowl at the point or points where the liquid changes the direction of its flow from the horizontal to the vertical.

Figure 1:
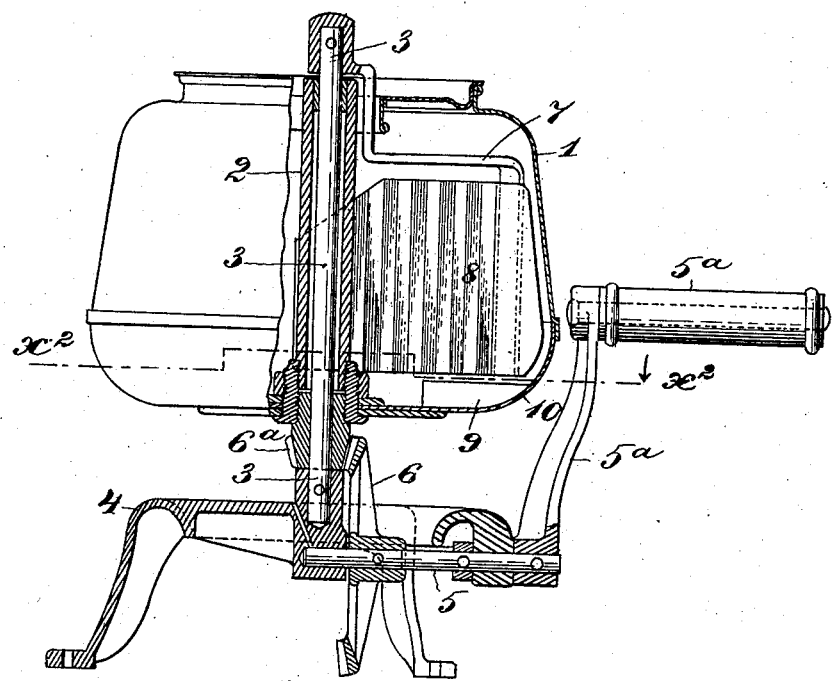
Figure 2:
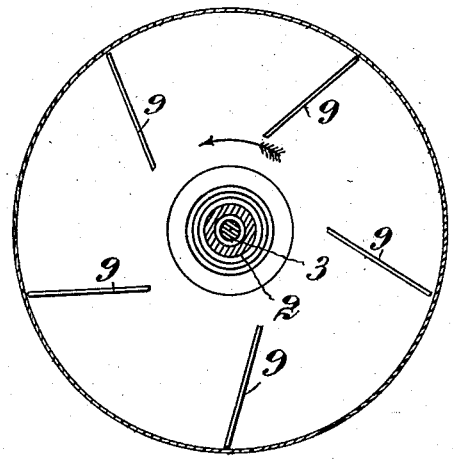
Figure 3:
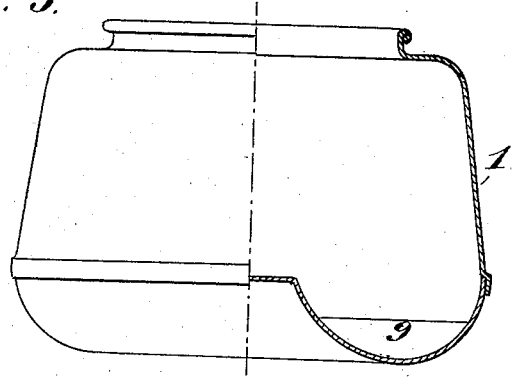
Figure 4:
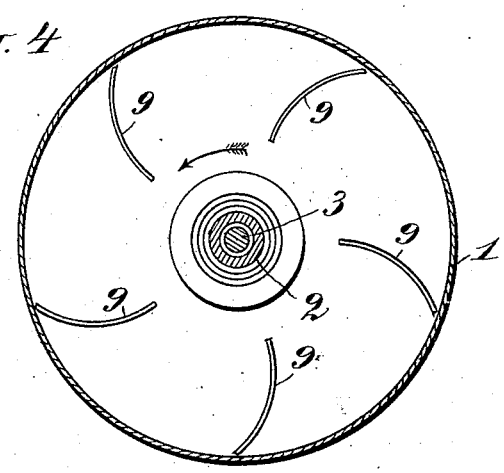

In the accompanying drawings which illustrate an embodiment of the invention—Figure 1 is a vertical section of the churn, except as to a part at the left-hand side of the bowl, which is in elevation; and Fig. 2 is a horizontal section at the line $x^2$ in Fig. 1. Fig. 3 shows a bowl of slightly different form; and Fig. 4 shows the fixed wings slightly curved, while those shown in Fig. 2 are flat or planes.

Referring to Figs. 1 and 2, the bowl 1 has a central tubular hub 2, whereby the bowl is rotatively mounted on an upright spindle 3, fixed in a suitable base 4. The bowl is driven through the medium of a shaft 5, rotatively mounted in the base and provided with a crank $5^a$ and bevel wheel 6, the latter gearing with a bevel pinion $6^a$ on the hub of the bowl. On the spindle 3 is secured an arm 7, carrying the fixed upright agitating wing 8, which may be a grid, or a vertically corrugated plate. In Fig. 1 the latter form is shown.

In the bottom of the bowl are fixed the stationary wings 9, which are disposed vertically or upright in the bowl and obliquely to the radius thereof. In Fig. 2 these wings are represented as planes, or flat; and in Fig. 4 they are represented as curved when seen in plan, the convex face being on that side where the wings make an acute angle with the wall of the bowl.

In Fig. 1, the bottom of the bowl curves upward where it joins the wall of the bowl, forming an annular concavity at 10; and in Fig. 3 there is also an annular concavity near the center or axis, these two concavities, in fact, merging in such a manner as to give to the bottom of the bowl an annular concave form, as clearly shown.

The effect of the construction described on the cream in the bowl, when the latter is rotated about its vertical axis in the direction of the arrow in Fig. 2, is to cause the oblique wings 9 to drive the cream outward toward the wall of the bowl, and upward along this wall, the flow being facilitated materially by the concavity at 10. If the bowl be rotated in the opposite direction, the same upward flow will be produced, but the cream will be driven toward the axis of the bowl. With the wings curved as in Fig. 4, which is the preferred form, the result is the same but perhaps slightly accentuated.

Having thus described my invention, I claim—

1. In a rotary churn, in combination, a bowl which rotates continuously in one direction, a stationary dasher located therein, and a plurality of wings fixed to the bottom of the bowl just below said dasher, each of said wings being disposed obliquely to the radius of the bowl with its inner end advanced in the direction of the movement of the bowl.

2. In a rotary churn, in combination, a bowl which rotates continuously in one direction, a stationary dasher located therein, and a plurality of wings fixed to the bottom of the bowl just below said dasher, each of said wings having a laterally convex face and disposed obliquely to the radius of the bowl with its inner end advanced in the direction of the movement of the bowl and its convex face disposed in the direction which the blades are advancing.

3. A rotary churn, having a bowl which rotates continuously in one direction, a stationary dasher located in said bowl, and a plurality of equally spaced like wings fixed in the bottom of said bowl, said wings being each concavo-convex laterally and disposed obliquely to the axis of the bowl with their inner ends advanced in the direction of rotation of the bowl.

In witness whereof I have hereunto signed my name in the presence of two subscribing witnesses.

SVEN AUGUST EKEHORN.

Witnesses:
ROBERT APELGREN,
AUG. SORENSEN.